Oct. 12, 1954  F. E. BACHMAN ET AL  2,691,431
DRUM BRAKE
Filed Feb. 9, 1951  2 Sheets-Sheet 1

INVENTORS.
Fred E. Bachman
Joseph E. Klausner
BY
O. B. Garner
Atty

Oct. 12, 1954   F. E. BACHMAN ET AL   2,691,431
DRUM BRAKE
Filed Feb. 9, 1951   2 Sheets-Sheet 2

INVENTORS.
Fred E. Bachman
Joseph E. Klausner
BY
Atty.

Patented Oct. 12, 1954

2,691,431

UNITED STATES PATENT OFFICE 2,691,431

DRUM BRAKE

Fred E. Bachman and Joseph Edward Klausner, St. Louis, Mo., assignors to American Steel Foundries, Chicago, Ill., a corporation of New Jersey Application February 9, 1951, Serial No. 210,182

22 Claims. (Cl. 188—58)

Our invention relates to a railway car braking device and more particularly to a braking arrangement having a link mechanism for brake band actuation, brake bands and a related member for brake band stabilization.

An object of our invention is to devise a link mechanism to transmit the actuating forces necessary to urge brake bands into frictional engagement with brake drums.

Another object of our invention is to devise a brake band stabilizing member resiliently fastened to both the sprung and unsprung members of the truck frame and to the brake bands, and efficacious of cushioning vibratory motions of the brake bands relative to the brake drums.

Another object of our invention is to devise a compact link mechanism for brake band actuation wherein the links are short and efficiently disposed.

Another object of our invention is to support the live levers and associated operatively connected members upon release of the brake.

Another object of our invention contemplates a compact link mechanism for brake band actuation wherein a relatively short brake band release spring can be utilized.

The foregoing and other objects and advantages of the invention will become apparent from a consideration of the following specification and the accompanying drawings.

In each of the figures certain details have been omitted where more advantageously exemplified in other of the figures.

Figure 4:
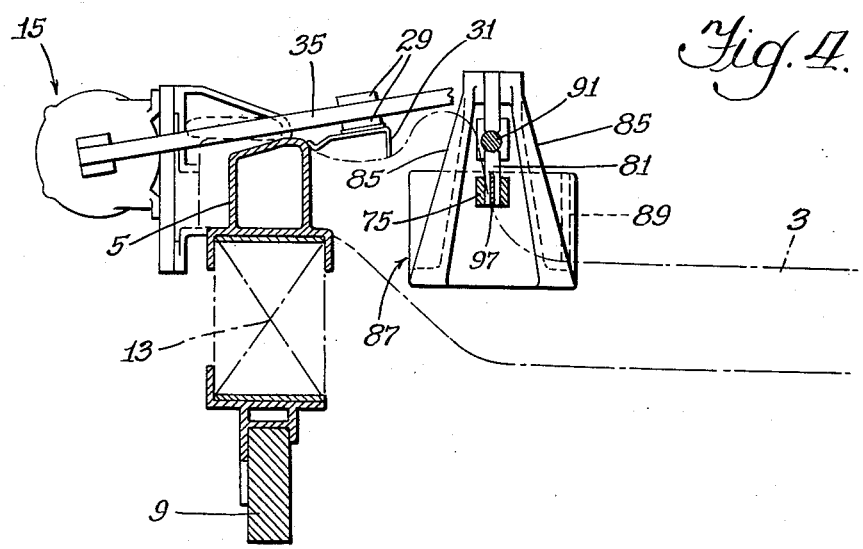
Figure 4 is a sectional view on the line 4—4 of Figure 1.

Describing the invention in detail and with reference to the drawings, our novel brake actuating link mechanism, brake bands and related brake band stabilizer are removably supported by a conventional railway car truck (shown in phantom lines). The truck comprises a truck frame, generally designated 1, having transoms 3, end rails 4, a longitudinal member 5 at each side of the truck, and dependent from the members 5 are spaced pedestal members 7 between which wheel and axle supported journal boxes 8 slidably engage. An equalizer, generally designated 9, at each side of the truck, is supported at its upturned ends 11 by the journal boxes. Conventional coil springs, diagrammatically indicated at 13 (Figure 4) are disposed between each longitudinal member 5 and the related equalizer 9.

Figure 1:
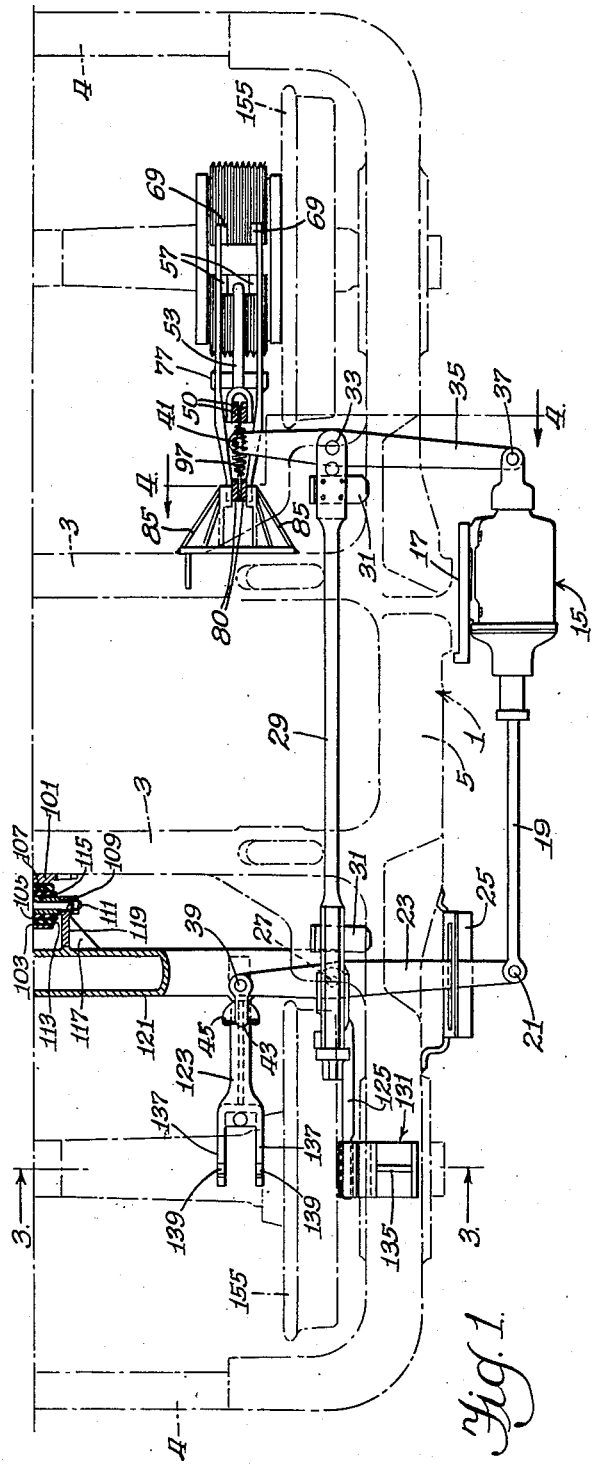
Figure 1 is a top plan view of a railway car truck embodying the invention; only one half of the truck is shown inasmuch as the brake system is symmetrical about the longitudinal center line.

A conventional piston and cylinder assembly, generally designated 15 (as best seen in Figure 1), is removably fastened to the truck frame at 17. A piston rod 19 of the assembly 15 is provided with a clevised end 21 pivotally pin connected to one end of a conventional live cylinder lever 23 slidably guided by a bracket 25. The lever is pivotally pin connected at 27 to the conventional slack adjuster end of a pull rod 29, slidably supported by brackets 31 on top of the frame 1. The opposite clevised end of the pull rod is pivotally pin connected at 33 to a conventional dead cylinder lever 35, and the lever 35 is pivotally pin connected and fulcrumed at 37 in a stationary clevised end of the piston and cylinder assembly 15.

Figure 2:
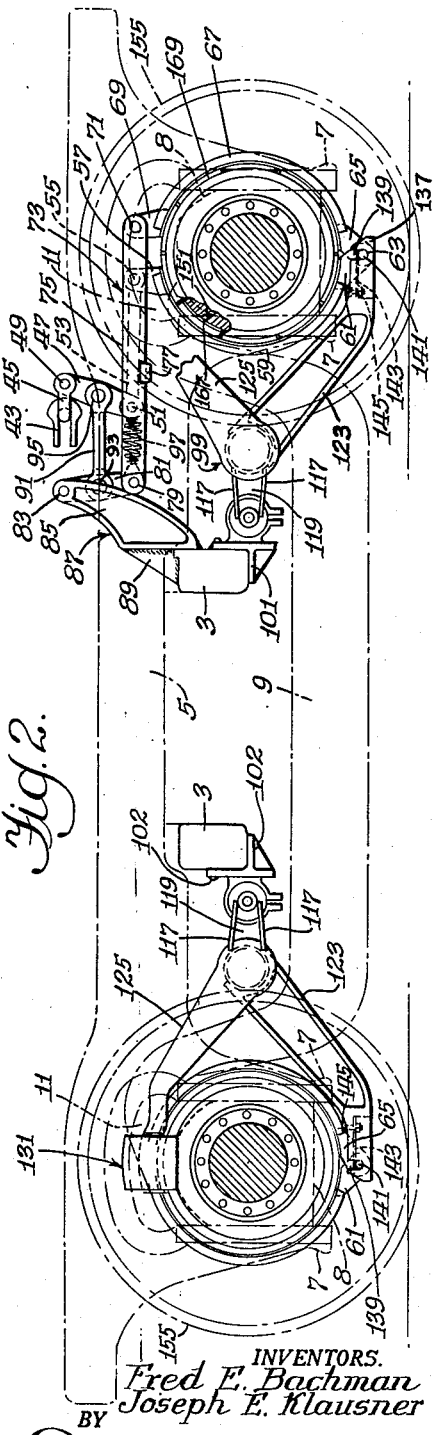
Figure 2 is a side elevation view.

Each of levers 23 and 35 are pivotally pin connected at 39 and 41, respectively, to a clevis 43 interlinked with a clevis 45, as best seen at the right of Figure 2. An auxiliary live lever 47 is pivotally pin connected at 49 to each clevis 45, and the lower end of lever 47 is bifurcated and is pivotally pin connected at 51 to the bifurcated end of a brake band compression link 53. The opposite end of the link 53 is pivotally pin connected at 55 to spaced lugs 57 on the upper end of a brake band segment 59 having lower spaced lugs 61 pivotally pin connected at 63 to lower spaced lugs 65 of a brake band segment 67. The segment 67 comprises upper spaced lugs 69 pivotally pin connected at 71 to the bifurcated end of a brake band tie link, generally designated 73, said link comprising spaced longitudinal members 75 welded to a crosspiece 77. The opposite bifurcated end of the link 73 is pivotally pin connected to a lower clevised end 79 of a dead auxiliary lever 81. The upper end of lever 81 is pivotally pin connected at 83 to spaced side plates 85 of a fulcrum bracket, generally designated 87, said bracket being welded to the transom 3 of the sprung truck frame 1 and also secured by a gusset 89. A compression link 91 interconnects the auxiliary levers 47 and 81 at pivotal pin connections 93 and 95. A brake release spring 97 interconnects the inner ends of the brake band tie and compression links 53 and 73, said spring being secured within the bifurcated ends 59 and 89 of the auxiliary levers by the pivotal pin connections at 51 and 79.

A brake band stabilizing member, generally designated 99, comprises a support bracket 101 detachably fastened as at 102 (Figure 2) to the transom 3. The bracket 101 contains sleeves 103, 105, and 107 alternately arranged with resilient sleeves 113 and 115. The sleeve 107 is connected by a bolt and nut assembly 111 to a bearing plate 119 at each side of the truck frame 1, said plate being attached to a transverse brake support member 121 and to the supporting gusset plates 117. The support member 121 is provided at each end thereof with diverging arms 123 and 125. The upper end of arm 125 is resiliently secured by pads 127 within an opening or jaw 129 (Figure 3) of a bracket, generally designated 131; said bracket is supported upon the top of the related journal box 9 and rigidly constrained there by the upstanding end 11 of the equalizer resting complementally upon a bracket surface 133 provided with a transverse ridge 135. The members 121, 123 and 125 constitute a branched support or stabilizer support or stabilizer structure for the brake bands.

Figure 3:
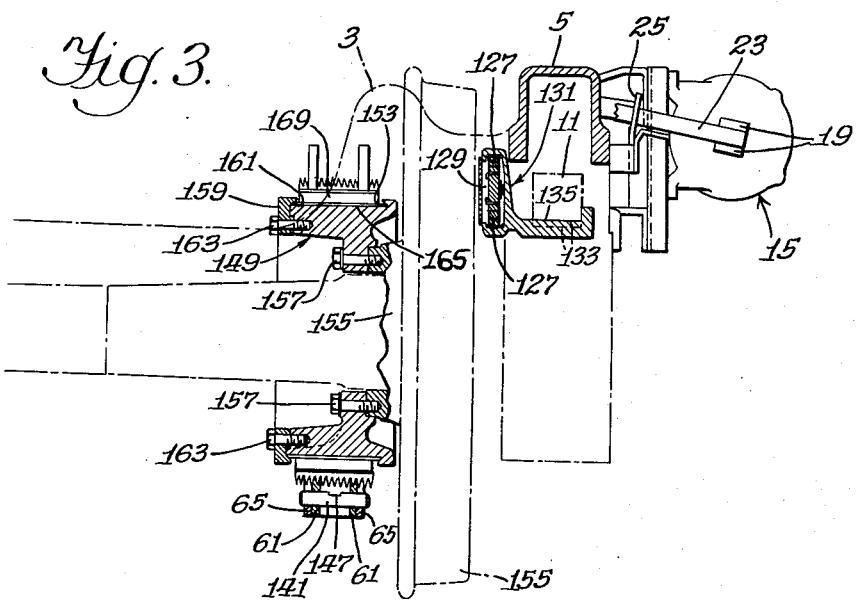
Figure 3 is a sectional view on the line 3—3 of Figure 1.

The arm 123 is provided with a bifurcated end or jaw 137 which receives the lower pivotally interconnected spaced brake band lugs 61 and 65; vertical slots 139 are provided in the sides of the bifurcated end 137 through which the ends of a pin 141 protrude. This pin, as best seen in Figure 3, pivotally interconnects the band lugs 61 and 65. A cantilever spring 143 is fastened to arm 123 by a bolt and nut assembly 145 and yieldingly bears upon a flat 147 of the pin 141.

A brake drum, generally designated 149, having equally spaced keyways 151 (Figure 2) and an annular recess 153 (Figure 3) is detachably fastened to the inboard side of each wheel 155 by bolts 157 for rotation therewith. A ring 159 having an annular recess 161, is detachably fastened to the brake drum by bolts at 63. Cylindrical segments 165 (Figure 3) having equally spaced axial keys 167 (Figure 2) and arcuate friction blocks 169 secured to the outer peripheral surfaces thereof, are splined on the brake drum by said keys 167 and keyways 151 and are retained within the annular recesses 153 and 161 by the bolts 163.

The operation of the invention is as follows:

The braking mechanism is actuated by the conventional piston and cylinder assembly 15 wherein a fluid under pressure is introduced to impart the actuating force on piston rod 19 and causing its motion to the left, as seen in Figure 1, thereby actuating the live cylinder lever 23, pull rod 29 and dead cylinder lever 35.

Each cylinder lever is connected as above described to the live auxiliary lever 47 associated with one wheel 155, to actuate the brake mechanism therefor. Upon release of the actuating braking force, the spring 97 causes the disengagement of the braking members.

Vibratory motions of the brake bands relative to the brake drum are cushioned by the resilient members—sleeves 113, 115, pads 127, and cantilever spring 143—of the brake band stabilizer 99.

We claim:

1. In a brake arrangement for a railway car truck having a truck frame and supporting wheel and axle assemblies with brake drums thereon; a pivotally interconnected link mechanism for drawing brake bands around said brake drums, said mechanism being disposed within spaced vertical planes intersecting the rotational axes of the wheel and axle assemblies and comprising a brake band tie link, a brake band compression link, a live auxiliary lever, a dead auxiliary lever, the levers being connected to respective links, an interconnected link connected intermediate the ends of said live and dead levers, a brake release spring interconnecting said tie and compression links, and a support bracket fastened to said truck frame and fulcruming said dead lever.

2. In a railway car truck having a sprung truck frame and unsprung journal boxes and brake bands; a brake band stabilizer structure comprising a support bracket fastened to said sprung truck frame and presenting resilient universal connecting means, a transverse member universally connected to said connecting means, spaced diverging arms extending from said transverse member and having diverging ends resiliently attached to said journal boxes and to the brake bands, respectively.

3. In a railway car truck having a sprung truck frame and unsprung journal boxes and brake bands, a brake band stabilizer structure having branched interconnected members, resilient members attached to said branched members, respectively, and means for interconnecting said resilient members to said truck frame, journal boxes and brake bands, respectively.

4. In a brake arrangement for a railway car truck having a truck frame and supporting wheel and axle assemblies with brake drums thereon; a brake band, a link mechanism for drawing said brake band around one of said brake drums comprising a longitudinally disposed tie link formed of spaced members secured at the bottoms thereof by a crosspiece, said tie link being pivotally connected at its outer end to one end of the brake band, a longitudinally disposed compression link pivotally connected at its outer end to the other end of the brake band and disposed between the spaced members of said tie link, a dead auxiliary lever pivotally connected at one end thereof to the inner end of said tie link and between the spaced members thereof, a live auxiliary lever pivotally connected at one end thereof to the inner end of said compression link and between the spaced members of said tie link and intermediate the ends thereof, an interconnecting link being pivotally interconnected intermediate the ends of said dead and live levers, a brake release spring disposed between the spaced members of the tie link, the ends of said spring being connected to the related ends of said dead and live levers, a supporting bracket fastened to said truck frame and presenting means to pivotally fulcrum the other end of said dead lever, and means for connecting the live lever to an associated actuating member.

5. In a link mechanism for operatively engaging a brake band with an associated brake drum, the combination of lugs connected to respective ends of said band, a tie link fastened to one of said lugs, a compression link fastened to the other of said lugs, said links being free from direct connection with each other, and actuating means connected to both links for urging said links in opposite directions, respectively, to engage said band with said drum and thereby develop compressive stresses in said compression link.

6. In a railway car truck having a sprung truck frame and unsprung journal boxes; the combination of sprung brake bands having pivotally interconnected brake band segments, a brake band stabilizer structure comprising a support bracket fastened to said sprung truck frame, a transverse member universally connected to said support bracket, spaced diverging arms extending from said transverse member and having diverging ends resiliently attached to said journal boxes and brake bands, respectively.

7. In a railway car truck having a sprung truck frame and unsprung journal boxes; the combination of brake bands having pivotally interconnected brake band segments, a brake band stabilizer structure having branched interconnected members, resilient members attached to said branched members, respectively, and means for fastening said resilient members to said truck frame, journal boxes and brake bands, respectively.

8. In a brake arrangement for a railway car truck having a truck frame and supporting wheel and axle assemblies at least one of which carries a brake drum thereon; the combination of a pair of pivotally interconnected brake band segments, a pivotally interconnected link mechanism for drawing said brake band segments around the brake drum, said mechanism being disposed within spaced vertical planes bisecting the rotational axes of the wheel and axle assemblies and comprising a brake band tie link, a brake band compression link disposed within said tie link, a live auxiliary lever, a dead auxiliary lever, an interconnected link connected intermediate the ends of said live and dead levers, a brake release spring interconnecting said tie and compression links, and a support bracket fastened to said truck frame and fulcruming said dead lever.

9. In a link mechanism for operatively engaging a brake band with an associated brake drum, the combination of a tie link having an end secured to one end of said brake band, a compression link having an end secured to the other end of said brake band, said links being free from direct connection with each other, a lever system connected to the ends of said links opposite the first mentioned ends thereof for urging said second mentioned link ends apart to engage the band with said drum and thereby put the compression link under compression, and resilient release means for urging said second mentioned link ends together to disengage the band from said drum upon release of said lever system.

10. In a brake arrangement for a railway car truck having a sprung truck frame and unsprung journal boxes and supporting wheel and axle assemblies with brake drums thereon; the combination of brake bands having pivotally interconnected brake band segments, a brake band tie link having spaced members, a compression brake band link disposed within said spaced members, a crosspiece securing said spaced members and presenting a bearing surface for said compression link, a brake band stabilizer structure having branched interconnected members, resilient members attached to said branched members, respectively, and means for interconnecting said resilient members to said truck frame, journal boxes, and brake bands, respectively.

11. In a brake arrangement for a railway car truck having a sprung truck frame with a member of a brake band stabilizer structure secured thereto and a brake band comprising pivotally pin connected brake band segments; the combination of an arm depending from said stabilizer member and having a bifurcated end with spaced slots, a cantilever type spring secured to said arm and disposed within said bifurcated end, said brake band segment pivotal pin connection being disposed within said bifurcation, the pin ends being retained in the slots and the cantilever spring yieldingly bearing upon the pin intermediate the pin ends to resist the motion of the brake band.

12. In a railway car truck having a sprung truck frame and unsprung journal boxes and brake bands; the combination of a brake band stabilizer structure, resilient members, means for attaching said resilient members to said stabilizer structure, and means for attaching said stabilizer structure resilient members to said truck frame, journal boxes and brake bands.

13. In a brake arrangement for a railway wheel and axle assembly having a brake drum; the combination of brake band segments adapted to embrace the drum, interconnected live and dead levers operatively connected to respective band segments, and means in the connection between the dead lever and its band segment for supporting the live lever upon release of the brake.

14. In a brake for a railway car truck having a truck frame and a supporting wheel and axle assembly with a rotatable brake surface; the combination of a dead lever fulcrumed to the frame, a live lever operatively connected to the dead lever, brake means engageable with said surface, links connecting the levers to said brake means, and means carried by the dead lever link for supporting the live lever link upon release of the brake.

15. In a railway car truck having wheel and axle assemblies with journal boxes, and having unsprung equalizers supported by the boxes and affording a sprung support for the truck frame; the combination of brake bands, a mechanism for drawing the brake bands around brake drums disposed within spaced vertical planes intersecting the rotational axis of the wheels, a piston and cylinder having live and dead cylinder levers connected thereto, a pull rod interconnecting said levers and provided with slack adjusting means, said mechanism comprising live and dead auxiliary levers, means for pivotally interconnecting the related live auxiliary levers to the associated live and dead cylinder levers, a link interconnecting said live and dead auxiliary levers intermediate the ends thereof, a brake band tie link, a brake band compression link, said brake band links connected to the related auxiliary levers, a brake release spring interconnecting said brake band links, a support bracket fastened to said truck frame fulcruming said dead auxiliary lever, a brake band stabilizer structure comprising spaced support brackets fastened to said truck frame and presenting resilient universal connecting means, transverse members attached thereto, spaced diverging arms extending from said transverse members and having ends resiliently attached to said journal boxes and brake bands, respectively.

16. In a link mechanism for operatively engaging a brake band with an associated brake drum, the combination of lugs connected to respective ends of said band, a tie link fastened to one of said lugs, a compression link fastened to the other of said lugs, and actuating means interconnecting said tie link and said compression link, whereby said links may be urged to move in opposite directions, the movement of said tie link and compression link being colinear.

17. In a link mechanism for operatively engaging a brake band with an associated brake drum, the combination of a tie link having an end secured to one end of said brake band, a compression link having an end secured to the other end of said brake band, a connection between the ends opposite the mentioned ends of said tie link and compression link, respectively, comprising flexible means for urging said second mentioned link ends together and lever means for urging said second mentioned link ends apart, the tie link, the compression link, and the flexible means being coplanar.

18. In a brake arrangement for a railway car truck, a wheel and axle assembly with a rotatable drum, a frame carried by the assembly, a brake band cooperating with said drum, a mechanism for urging said band into engagement with said drum, a brake stabilizing unit comprising a member flexibly connected to the frame and having resilient connections to said band and wheel and axle assembly, respectively.

19. A brake arrangement for a railway car truck according to claim 18, wherein said mechanism comprises coplanar links having ends connected to the respective ends of said band, a spring resiliently interconnecting the other link ends, and means interconnecting the last mentioned link ends operative to concurrently urge said band to engage said drum and to place said spring under tension.

20. In a brake arrangement, a frame, a rotatable drum connected to the frame, a brake band cooperating with said drum, means including a tie link and compression link having ends connected to the related ends of said band for urging said band to frictionally engage and disengage said drum, an equalizer unit operative to cushion and distribute braking torque to said frame, said unit having a universal resilient connection to the frame and a flexible connection to the brake band.

21. A brake arrangement according to claim 20, wherein said means also include a resilient spring interconnecting the ends opposite the mentioned ends of said links, a live auxiliary lever pivotally associated with the second mentioned end of one of said links, a dead auxiliary lever pivotally associated with the second mentioned end of the other of said links, a bar pivotally interconnecting said dead and live levers intermediate the ends thereof and means for actuating said live auxiliary lever.

22. In a link mechanism for operatively engaging a brake band with an associated brake drum, the combination of links having ends secured to the related ends of said band, respectively, a release spring interconnecting the ends opposite the mentioned ends of said links, a live auxiliary lever pivotally associated with the second mentioned end of one of said links, a dead auxiliary lever pivotally associated with the second mentioned end of the other of said links, a compression link pivotally interconnecting said dead and live levers intermediate the ends thereof, and means for actuating said live auxiliary lever.

References Cited in the file of this patent

UNITED STATES PATENTS

| Number | Name | Date |
| --- | --- | --- |
| 2,187,993 | Anderson | Jan. 23, 1940 |
| 2,196,242 | Anderson | Apr. 9, 1940 |
| 2,492,816 | Rosman | Dec. 27, 1949 |